F. B. PRINDLE.
Bolt-Heading Machines.

Patented March 17, 1874.

Fig. 1.

Witnesses:
Jas. E. Hutchinson
John R. Young

Inventor:
F. B. Prindle, by
Prindle and Co., his Attys

F. B. PRINDLE.
Bolt-Heading Machines.

No. 148,754. Patented March 17, 1874.

Fig. 2.

Witnesses:
Jas. E. Hutchinson
John R. Young

Inventor:
F. B. Prindle, by
Prindle and __ his Attys

F. B. PRINDLE.
Bolt-Heading Machines.

Patented March 17, 1874.

Witnesses: Jas. C. Hutchinson, John R. Young

Inventor: F. B. Prindle, by Prindle and Co., his Attys

F. B. PRINDLE.
Bolt-Heading Machines.

No. 148,754. Patented March 17, 1874.

Witnesses:
Jas. E. Hutchinson
John R. Young

Inventor:
F. B. Prindle by
Prindle and Co. his Attys

AM. PHOTO-LITHOGRAPHIC Co. N.Y. (OSBORNE'S PROCESS)

F. B. PRINDLE.
Bolt-Heading Machines.
No. 148,754. Patented March 17, 1874.

UNITED STATES PATENT OFFICE.

FRANKLIN B. PRINDLE, OF SOUTHINGTON, CONNECTICUT.

IMPROVEMENT IN BOLT-HEADING MACHINES.

Specification forming part of Letters Patent No. 148,754, dated March 17, 1874; application filed December 26, 1872.

*To all whom it may concern:*

Be it known that I, FRANKLIN B. PRINDLE, of Southington, in the county of Hartford and in the State of Connecticut, have invented certain new and useful Improvements in Bolt-Heading Machines; and do hereby declare that the following is a full, clear, and exact description thereof, reference being had to the accompanying drawings making a part of this specification, in which—

Letters of like name and kind refer to like parts in each of the figures.

The design of my invention is to enable bolts to be headed by machinery in a more perfect manner than has heretofore been practicable; and to this end it consists, principally, in the combination, with an end-upsetting punch or die and two pairs of lateral swaging-dies arranged to form heads upon bolts, of mechanism that shall first cause the upsetting-punch to stave up the end of the rod, and then the two pairs of lateral swages to swage the sides of said staved-up portion, in the manner hereinafter described—that is to say, the one pair to move forward and compress the metal on two opposite sides and remain in close contact therewith, while the other pair passes between the faces of said first pair and swages the other two sides, substantially as is hereinafter specified. It consists, further, in the means employed for connecting the sliding bars to or with the carriers for operating the holding-dies and side-swages, substantially as and for the purpose hereinafter specified. It consists, further, in the means employed for imparting a reciprocating movement to the sliding bars which operate the holding-die and side-swages, substantially as is hereinafter shown. It consists, further, in the means employed for imparting a reciprocating motion to the cross-head, substantially as and for the purpose hereinafter shown and described. It consists, further, in the means employed for imparting a reciprocating motion to the plunger-carrier, substantially as and for the purpose hereinafter specified. It consists, further, in the peculiar construction of the vertical swage-carriers and their combination with the cross-head, substantially as and for the purpose hereinafter shown. It consists, further, in the construction of the vertical swage-holders and the means employed for combining the same with their carriers, substantially as and for the purpose hereinafter set forth. It consists, further, in the means employed for operating the vertical swages, substantially as and for the purpose hereinafter shown and described. It consists, further, in the device as a whole, when its several parts are constructed and combined substantially as and for the purpose hereinafter set forth.

Figure 1:
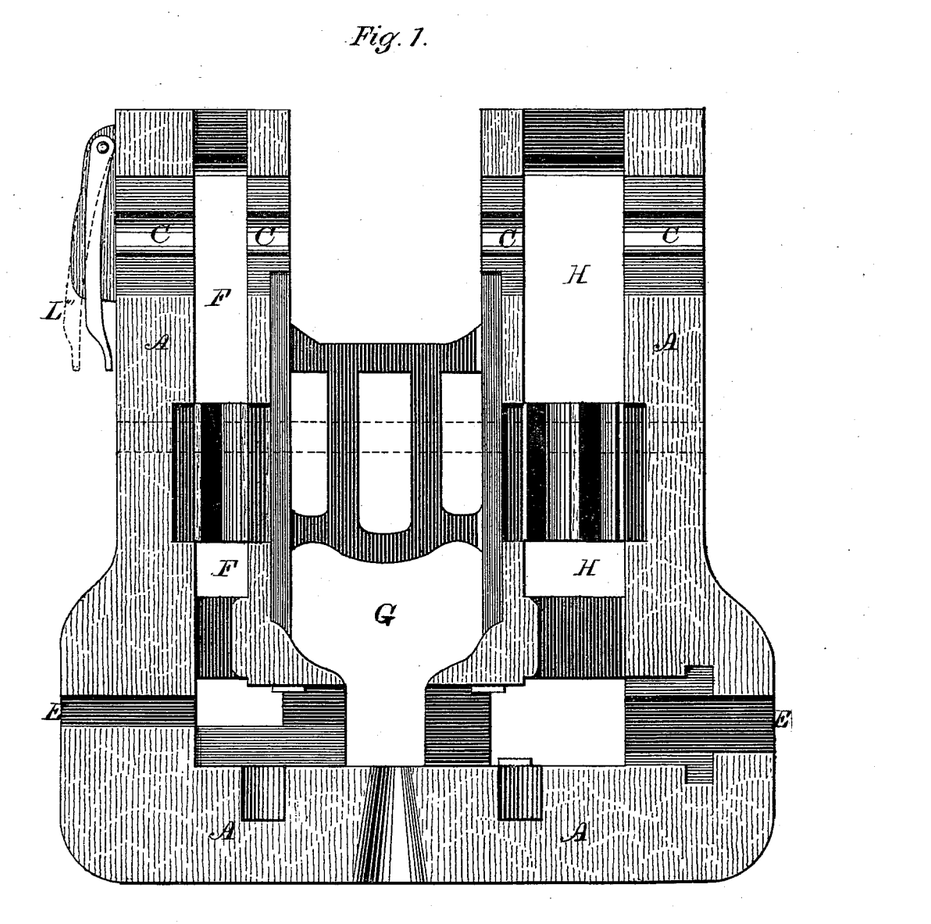
Figure 1 is a plan view of the upper side of the frame or bed of my machine with the operating mechanism removed.
Figure 2:
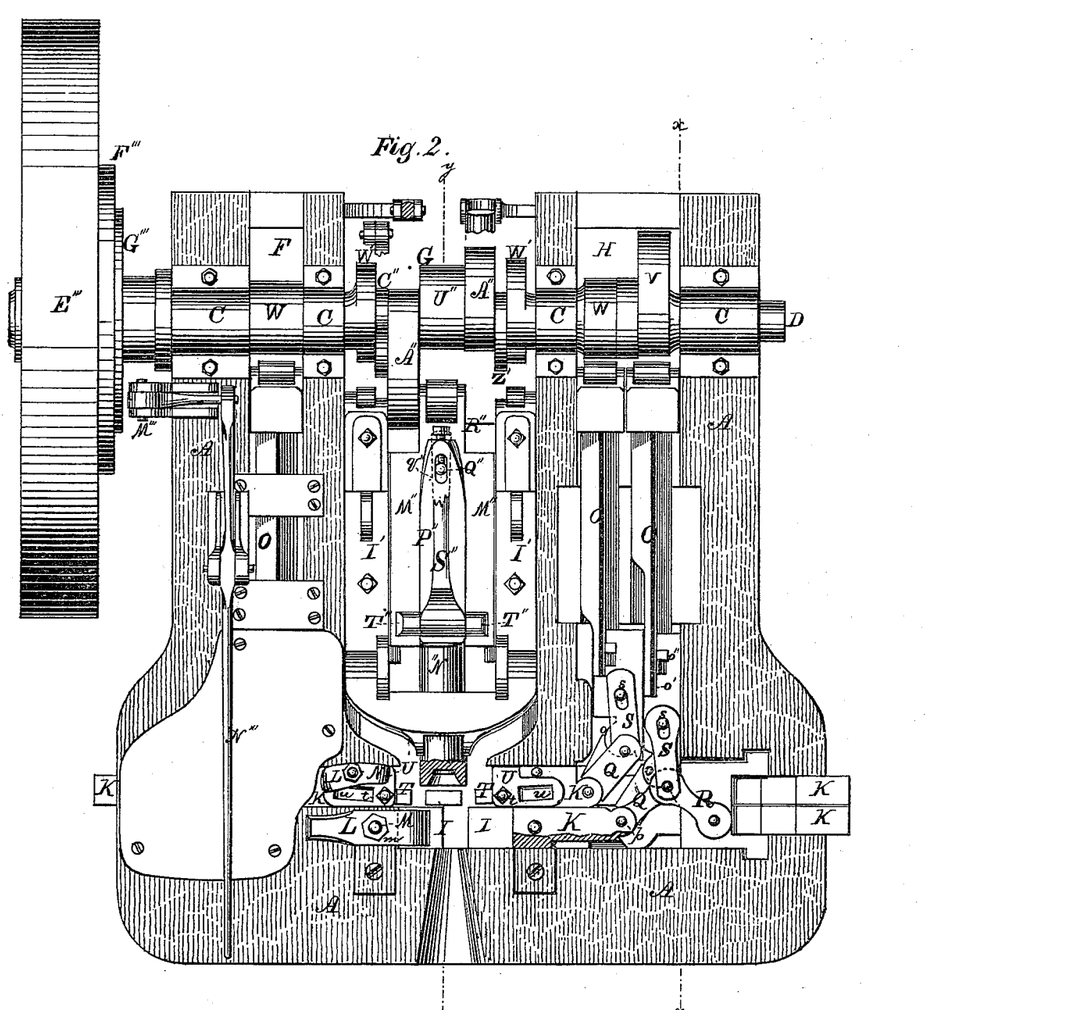
Fig. 2 is a like view of said machine with all parts in place, with exception of the top lever for operating the dies.
Figure 4:
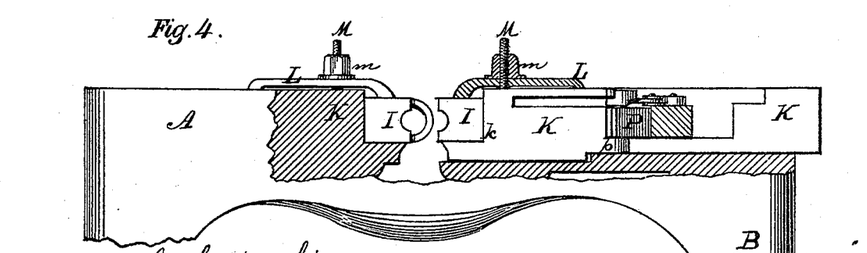
Fig. 4 is a like view of the front end of the machine with the frame broken away, so as to show the holding-dies.

In the annexed drawing, A represents the bed-plate, constructed of metal in the form shown, and supported upon and by means of four legs, B, which are, preferably, placed at the corners of said frame. Journaled within suitable boxes C near the rear end, and upon the upper side of the bed-plate A, is a shaft, D, which extends transversely across the same, and has secured upon its periphery a number of cams for operating the mechanism of the machine, said shaft being extended beyond one side of the frame, so as to receive a band-wheel or other equivalent device for connecting the same to or with the motive power. Extending transversely across and within the upper side of the bed-plate A is a groove, E, for containing the carriers for the holding-dies and side-swages, while three other grooves, F, G, and H, extend rearward from said groove E, and furnish housings for, and within which are contained, the means employed for connecting said dies and swages with their operating-cams, and also the mechanism of the plunger or end-swage and the upper and lower swages. Such portions of the lower sides of said grooves as are not needed for bearings are cut away so as to permit of the passage of mechanism from beneath the bed-plate, and also to reduce the weight of the latter. The holding-dies I are each secured in position within an angular notch, k, in the outer end of their holders K by means of a clamp, L, that rests upon said holder and die, and is caused to bear firmly against the same by a bolt, M, which is secured within said holder, and, extending vertically upward through said clamp, is provided upon its upper threaded end with a nut, m, the action of said parts being to firmly clasp said die between said clamp and the lower side or lip of said notch k. As is usual in machines of this class, but one of the holding-dies is movable automatically, the holder or carrier K of the left-hand die being secured in position longitudinally and vertically by means of a clamp, N, which is fitted into a corresponding recess that is formed within the bed-plate and within said holder, while the opposite or right-hand die and its carrier are moved toward and from the center of the machine by means of the following-described mechanism: Resting in suitable bearings formed within the groove H is a bar, O, that is capable of longitudinal and horizontal movements, and at its forward end and inner side is provided with a bearing, o, which is formed upon a circle having a vertical axis. The carrier K is provided with a recess, P, as seen in Fig. 4, within the forward end and inner side of which is formed a semicircular bearing, p, that corresponds to and is in a line with the bearing o, while between said bearings is placed a bar, Q, which is provided upon its ends with corresponding semicircular concave bearings, and has a length just equal to the space between said parts. If, now, the bar O is moved forward, the carrier K will be correspondingly moved toward the center of the frame, so as to enable a piece of iron to be clasped between the holding-dies; and, as but little movement of the bearings is caused, the friction will be correspondingly small. As this arrangement of parts is of use only in producing a forward movement of the carrier, the retraction of the latter is effected by the following-described means: A toggle-bar, R, is pivoted at one end to or upon the upper end of the bearing p of the carrier, and at its opposite end to or upon the frame or other equivalent fixed support, above and in a line with the said carrier. To the center or joint of the toggle-bar is pivoted one end of a bar, S, which from thence extends rearward, and is attached to or upon the upper side of the sliding bar O, so that as the latter moves in either direction, a corresponding movement is communicated to the joint of said toggle-bar. In order to prevent undue wear upon the toggle-bar, and confine its operation to the retraction of the carrier, the bar S is connected to or with the sliding bar O by means of a stud or pin, s, that extends vertically upward from the latter through an opening in the former. By lengthening the opening upon its forward side, so as to enable the bar Q to have a firm bearing before motion is communicated to the toggle-bars, the latter will be drawn forward by the carrier, instead of being pushed forward by the sliding bar, while upon the back stroke said toggle-bars will draw said carrier, while the bearings of said bar Q will be relieved from all friction. The sliding bars O, within their bearings, are, preferably, constructed with a square form transversely, and are placed with one of their angles uppermost, while, as the forward ends of said bars must, of necessity, have a rectangular shape, and be placed with their upper and lower faces parallel to the upper surface of the bed-plate, it has been found advantageous to construct said bars in two portions and connect the same together. This result is effected, as shown in Fig. 2, by cutting away a portion of the overlapping faces of each section, and providing upon the face thus formed upon the rear section a tongue, $o'$, that extends laterally outward into a corresponding groove in the contiguous face of the front section, said groove having a slightly greater length than said tongue, so as to permit a wedge, $o''$, to be driven in rear of the latter. As thus arranged, it will be seen that as the wedge is driven to a bearing, said parts are firmly locked together and become substantially one, for the purpose of operating the machine, while for the purposes of construction or repair, said parts, being easily detached, are more readily manipulated. This construction also enables the forward sections of the sliding bar, upon which much wear and strain are thrown, to be made of steel, while the rear sections can be constructed of wrought or cast iron, as they are subjected to but little wear or strain. The side-swages T are made rectangular, and have, vertically, dimensions corresponding to the like feature of the bolt-head that it is designed to construct. Each swage is fitted into and contained within a corresponding groove that is provided within a block or keeper, U, which keeper has the form shown in Figs. 2 and 3, and is held in place with the end of its carrier in the same manner as are the holding-dies within their carriers. A set-screw, $t$, passing downward through the keeper U, with its lower end bearing against the upper side of the swage, holds the latter firmly in position therein. As the swage T works immediately in rear of the holding-dies, it is desirable that the former should bear against or come into contact with the latter only at their outer ends, to accomplish which result said swages are so placed within their holders as to incline slightly outward and rearward from their inner ends.

A slot, $u$, corresponding in position and width to the like features of the groove for containing the swage, is formed within the upper side of the keeper or holder U, and, opening into said groove, extends forward from its rear end, as shown. The object of this slot is to enable the swage to be more readily removed from its keeper in the event of its becoming wedged therein.

The mechanism employed for communicating to the side-swages the necessary reciprocating motion being the same as that heretofore described belonging to the movable holding-die, no further illustration is deemed requisite, and the parts are designated by letters of reference which correspond with those before named.

Motion is communicated to the holding-die through the bar O by means of a cam, V, which is secured to or upon the shaft D immediately in rear of said bar, and in its rotation with said shaft strikes against and moves said bar forward. As the holding-die must move forward before the swages or plunger, and remain in position until said parts have performed their office and withdrawn, that portion of the periphery of the cam V which is equidistant from its axis of motion has about three-fifths of a circle, and when said die has been closed holds it firmly in position until ready for the backward movement.

Figure 5:
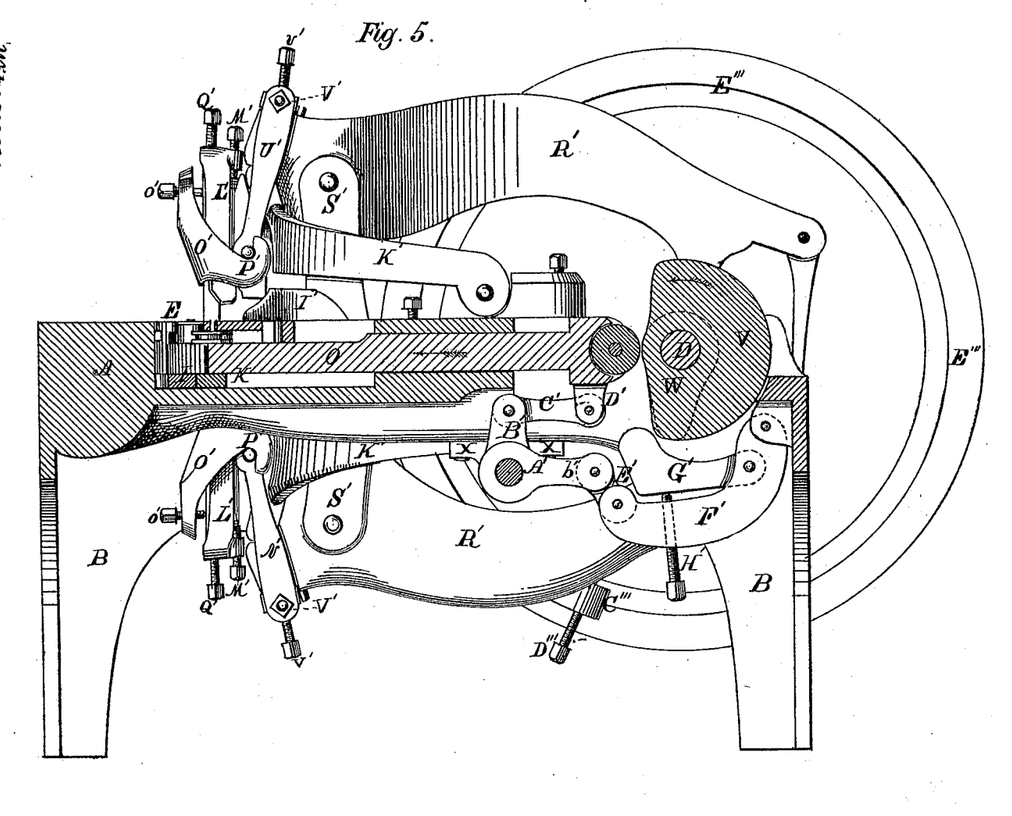
Figs. 5 and 6 are vertical longitudinal sections on lines $x\ x$ and $y\ y$ of Fig. 2.

The forward movement or closing together of the side-swages is effected in the same manner as in the holding-die; but, as said swages are required to move inward, and then instantly withdraw, the cams W, employed for their operation, have very narrow bearings, as seen in Fig. 5.

The holding-die and side-swages move outward simultaneously, and as the mechanism employed for effecting such operations are the same in each, the corresponding portions of said mechanism will be designated by the same letters of reference and a description of but one set or train given.

Supported within suitable boxes, X, upon the lower side of the bed-plate A is a shaft or round bar, $A'$, which has no motion within said boxes, but serves as a bearing for and upon which certain portions of the mechanism move. Journaled upon the shaft $A'$, directly beneath the bar O, is a hub, from which extend vertically upward and horizontally rearward a short and a long arm, $B'$ and $b'$, respectively. To the end of the vertical arm $B'$ is pivoted one end of a bar, $C'$, which from thence extends horizontally rearward, and has its opposite end pivoted to or upon a lug or ear, $D'$, that projects downward from the lower side and rear end of the sliding bar O. The horizontal arm $b'$ is connected by means of a short pivoted bar, $E'$, to or with one end of a lever, $F'$, which, having the form shown in Fig. 5, extends upward and rearward, and has its rear end pivoted to or upon the lower side and rear end of the bed-plate. A bar, $G'$, constructed in the form shown, is pivoted at one end to or within the front side of the lever $F'$, and near its rear end, and, from thence extending forward, rests upon the end of a screw, $H'$, which passes vertically upward through a threaded opening provided within said lever $F'$.

As thus arranged, the cam W, passing downward and rearward, strikes against the forward end of the bar $G'$, and depresses the same and the corresponding end of said lever, by which means the horizontal arm $b'$ is moved downward and the vertical arm $B'$ rearward, and through the connection C, the motion of the latter arm is communicated to the sliding bar O, and the same moved backward to its limit in that direction. By means of the set-screw $H'$ the pivoted bar or bearing $G'$ can be so adjusted to height as to cause the cam W to move the parts the exact distance necessary in order to return the sliding bar O to the end of its backward stroke.

The upper and lower swages being intended to move forward toward each other, again apart and then rearward, it is necessary that the carriers of said swages should have the requisite forward and backward movement independent of their vertical movement. This result is effected by means of a cross-head, I', which is contained by and slides longitudinally within the center groove G of the bed-plate, said cross-head being operated in substantially the same manner as are the sliding bars O.

Figure 3:
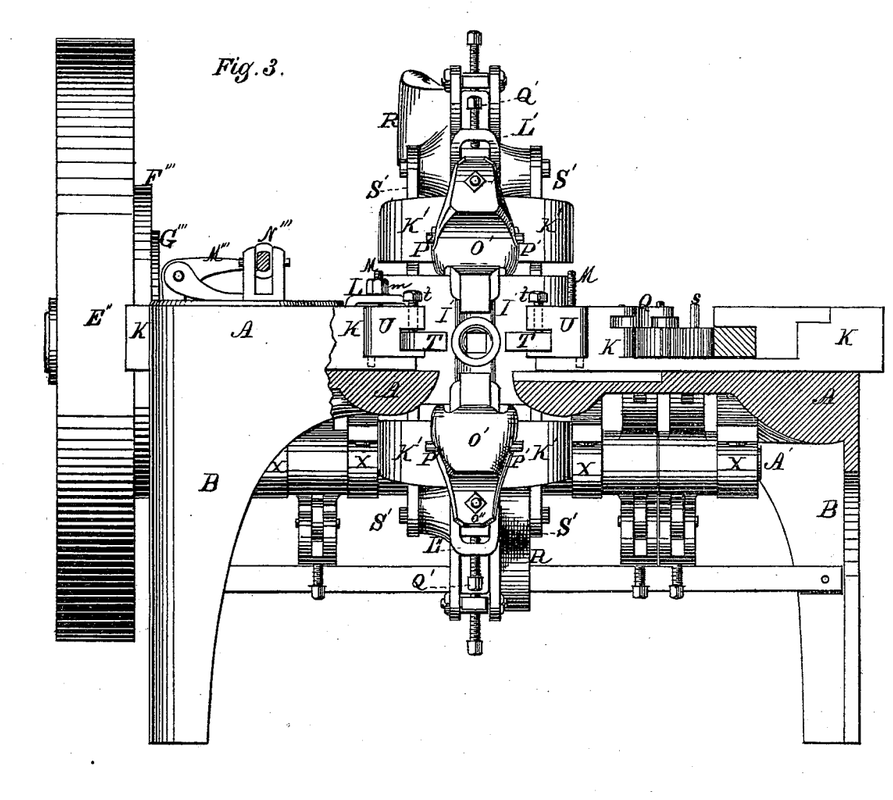
Fig. 3 is a front elevation of the same with the frame removed vertically and transversely upon a line corresponding to the rear edge of the holding-dies.
Figures 6, 7, 8, 9, 10:
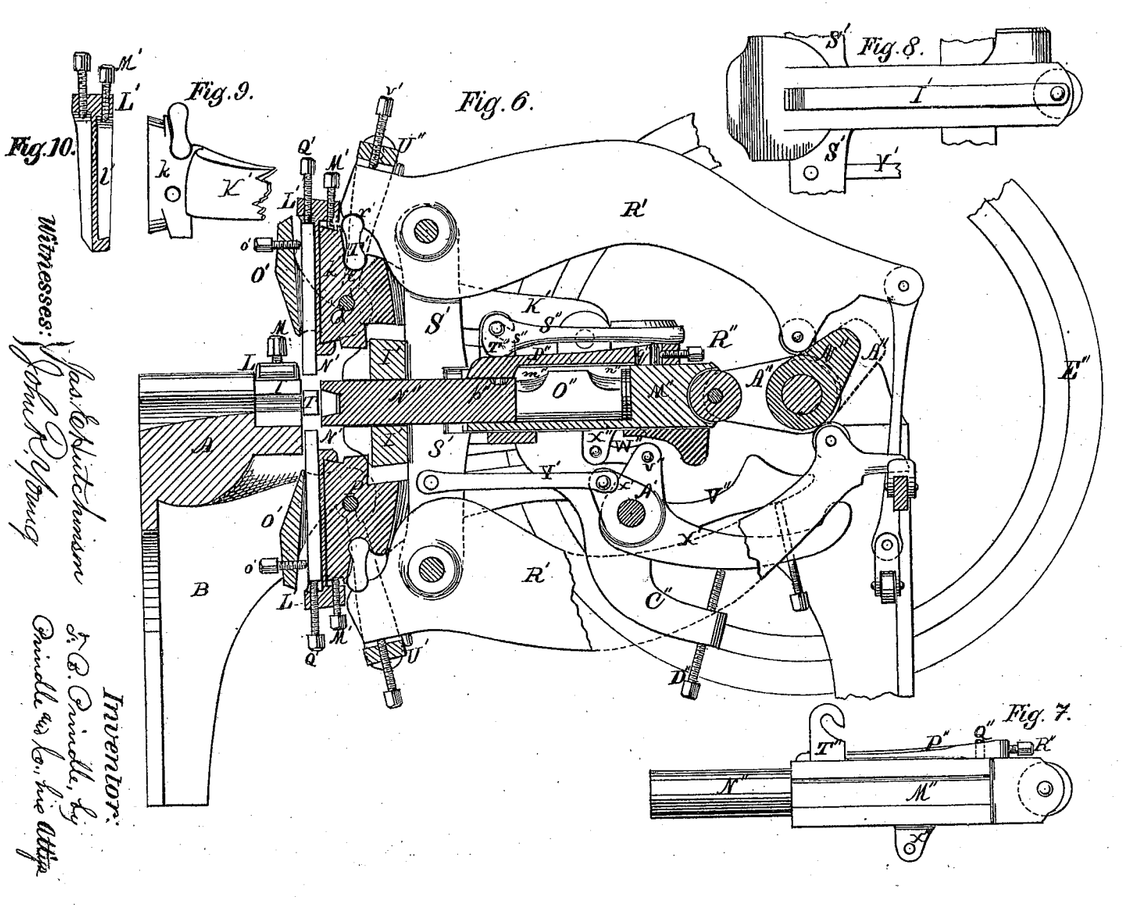
Fig. 7 is a side elevation of the plunger and its carrier.
Fig. 8 is a like view of the horizontally-reciprocating carrier for operating the upper and lower swages.
Fig. 9 is a partial side elevation of one of the pivoted vertically-reciprocating carriers for operating said swages.
Fig. 10 is a vertical central section of one of the holders for containing said swages.
Figure 11:
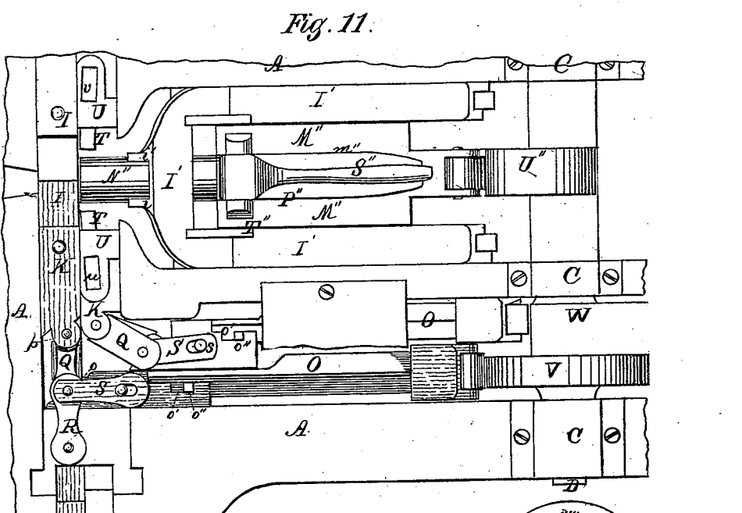
Fig. 11 is a partial plan view of the upper side of the machine, showing the holding-dies closed and the end swage or plunger at the limit of its forward stroke.
Figure 12:
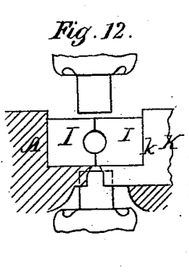
Fig. 12 is a front elevation of the holding-dies as thus closed, and shows the relative position of the upper and lower swages.

As seen in Figs. 2, 3, and 8, the cross-head I' fills the groove G laterally and vertically, while its central portion, from its rear end forward nearly to its front end, is recessed out so as to form a space having parallel sides. The front end of said cross-head is enlarged vertically, and at its transverse center extends forward, and is provided with a vertical right-angled groove, $i'$. Upon each side of the cross-head, at or just within its outer edges and near its rear end, is pivoted the rear forked ends of the vertical swage-carriers K', which from thence extend forward and then inward, and, uniting, form a lug, $k'$, that has the form in side elevation shown in Fig. 17, and extends forward with parallel vertical sides. Upon the forward side of the lug $k'$ is placed a swage-holder, L', which is provided within its rear side with a recess, $l'$, that corresponds to and embraces said lug, while a set-screw, M', passing inward through the outer end of said holder, bears upon the corresponding end of said lug and binds said parts firmly together. As the upper and lower ends of said lug are beveled inward and rearward, it will be seen that it is impracticable for said holder to become detached while said screw is in place. Within the forward side of the holder L' is provided a rectangular groove, open at its front and lower end, which corresponds to and receives the swage N', which swage is held therein by means of a clamp, O', that has the shape shown in Figs. 3 and 5, and, embracing the front and sides of said holder, extends rearward around a pin, P', which passes transversely and horizontally through the lug $k'$. A set-screw, $o'$, passing inward through the outer end of the clamp, bears against the forward face of the swage, and presses it firmly against the rear side of its groove, while a second set-screw, Q', passing inward through the outer end of the holder, bears against the corresponding end of said swage, and enables the same to be adjusted longitudinally within said holder.

Figures 16, 17, 18, 19:
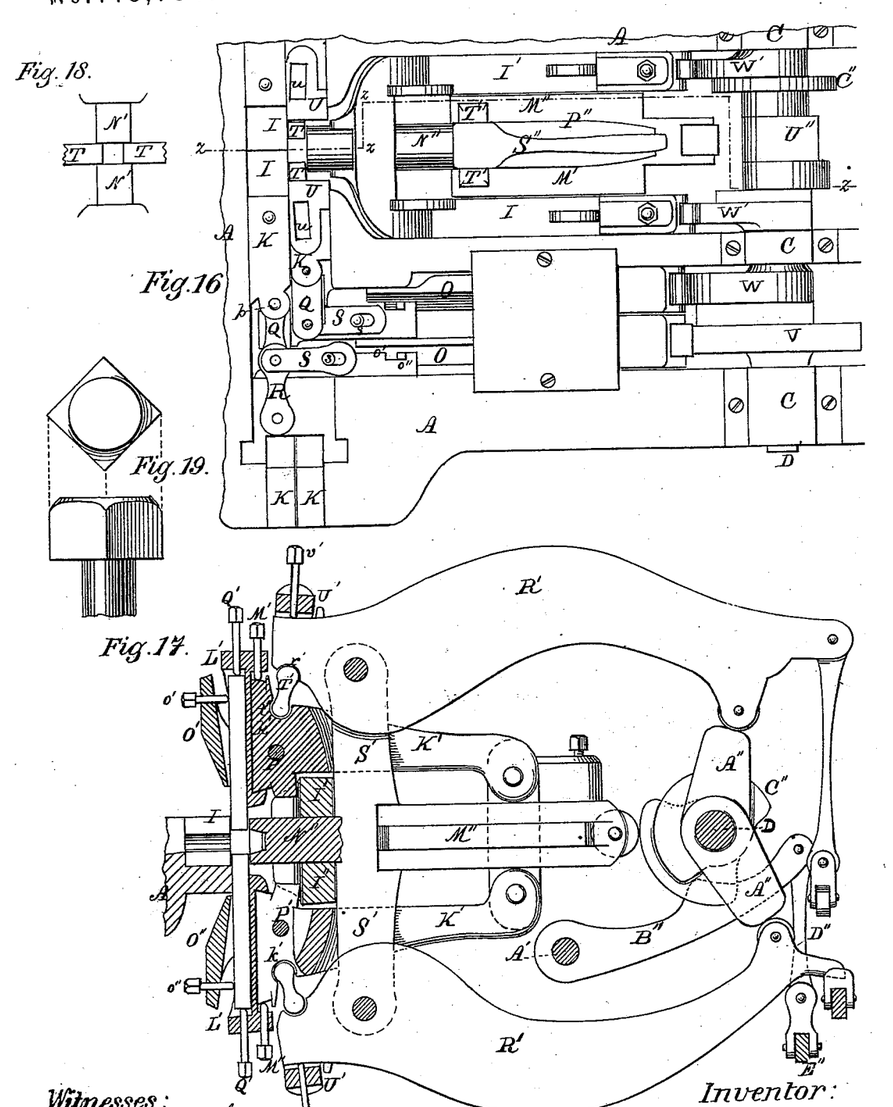
Fig. 16 is a partial plan view of the upper side of the machine, showing the relative positions of the holding-dies, the side and the end swages when closed together, and also the mechanism used for operating said parts.
Fig. 17 is a side elevation of the upper and lower swages with their operating mechanism, showing said swages closed and their positions with relation to the contiguous portions of the mechanism.
Fig. 18 is a front elevation of the upper and lower and the side swages as closed.
Fig. 19 is an end view and a side elevation of a bolt finished by my mechanism as arranged.

The vertical movement of each carrier K' is effected by means of a lever, R', which, having the form shown in Figs. 5, 6, and 17, is pivoted near its forward end to or between two standards, S', that extend vertically outward from near the front end of the cross-head I', and between the forked arms of said carrier. Within the front end and inner side of the lever R' is provided a semicircular groove, $r'$, that extends transversely across and receives the correspondingly-shaped end of a bar, T', the opposite end of which rests in a similar bearing, $t'$, that is formed within the outer end and rear side of the lug $k'$, the whole being so arranged as to cause an inward movement of the forward end of said lever, to be communicated to the vertical swage, and move the same in a like direction. In order that the outward movement of the forward ends of the levers R' may cause the vertical swages N' to recede from each other, two bars, U', are pivoted upon the pin P' of each carrier K', and, extending vertically outward and rearward, inclose the sides of the bar T', and of the lever at its end, and have their upper ends connected together by means of a bolt, V', which passes horizontally through the same, immediately outside of said lever end. A set-screw, $v'$, passing inward through the bolt V', bears against the end of the lever R', and confines said lever, the bar T', and the swage-carrier K' in their relative positions. The stirrup-clamp thus formed, acting in connection with said bar T', constitutes a flexible joint between said lever and swage-carrier. As the operation of the machine requires that the cross-head should move forward immediately after the holding-dies have closed, and remain in such position until both sets of swages and the plunger have performed their office, the cams W,' which move said cross-head forward, have circular peripheries nearly equal in circumference to the like features of the cams V, which operate said holding-dies.

Figures 13, 14, 15:
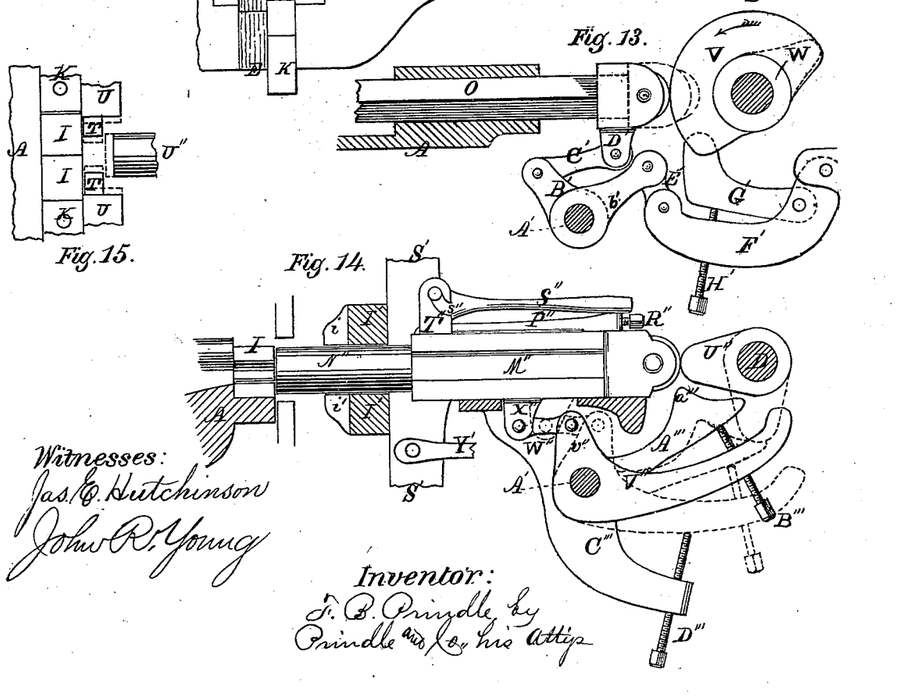
Fig. 13 is a side elevation of the cams and intervening mechanism for operating the holding dies.
Fig. 14 is a like view of the means employed for operating the plunger, the black lines showing the relative positions of the parts when said plunger has been moved forward, while the dotted lines show the positions of said parts when returned to place.
Fig. 15 is a partial plan view of the upper side of the holding-dies, the plunger or end-swage, and the side-swages, the dotted lines showing the positions of the latter when moved forward.

The cross-head is returned to its rear position by means of the following-described mechanism: Journaled upon the shaft A' is one end of a lever, X', which has the shape shown in Fig. 6, and, when the cross-head is at its forward stroke, extends rearward and upward beneath the shaft D. From the hub of the lever X' an arm, $x'$, extends upward and forward at substantially a right angle to the general direction of said lever, and is connected to or with one or both of the lower standards S' by means of a bar, Y', which is pivoted at its ends to or upon said parts. As thus arranged, it will be seen that if the rear end of the lever X' is depressed, the upper end of the arm $x'$ will be moved rearward, carrying with it the connecting-bar Y' and the cross-head. This result is effected by means of a cam, Z', which is secured to or upon the shaft D in a line with the lever X', and impinges upon the latter at the instant that the enlarged portions of the cams W' leave the rear end of the cross-head. The vertical outward movements of the rear ends of the levers and the corresponding opposite movements of the vertical swages are effected by means of two cams, A'', which are placed upon the shaft D directly opposite to each other, and in a line with said levers, and when bearing against the latter, they simultaneously move them in opposite directions. The portions of the cams A'' concentric to the shaft have a length equal to the time that it is designed to have the swages remain closed. In order that the levers R' may be returned to position and the vertical swages opened, a lever, B'', having the form shown in Fig. 17, is journaled at one end upon the shaft A′, and extends rearward beneath the shaft D, directly beneath and in contact with a cam, C″, which has a periphery concentric to said shaft that is about three-fifths of an entire circle. To the rear end of the lever B″ is pivoted one end of a rod or bar, D″, that from thence extends downward, and has its opposite end pivoted upon a bar, E″, which in turn is pivoted at its longitudinal center to or upon a brace, F″, that extends horizontally between the legs of the machine. To the right-hand leg, looking toward the front, is pivoted one end of a lever, G″, which, extending horizontally and laterally inward, has pivoted to or upon its opposite end one end of a short bar, H″, that is capable of motion in a vertical plane, and in a line with said lever, while within the opposite or upper end of said bar H″ is pivoted a second bar, I″, that has its axis placed at a right angle to that of said bar H″, so as to be capable of movement in a line fore and aft of the machine. The upper end of the connection I″ is pivoted to or upon the rear end of the upper lever R′, while from the center, longitudinally of the lever G″, a second connection, K″, passes downward, and is pivoted to or upon the contiguous end of the bar E″. As thus arranged, it will be seen that a downward movement of the rear end of the lever B″ will be communicated, through the rod D″, bar E″, connection K″, lever G″, bar H″, and connection I″, to the rear end of the lever R′, and, by depressing the latter, will cause the upper vertical swage to be moved away from its companion. The lower lever R′ is correspondingly and simultaneously moved by means of a connection, K″, lever G″, and pivoted bearing L″, which embraces the lower side and rear end of said lever, the operation of said parts being similar, but in an opposite direction, to those connected with the upper lever R′. Within the recess formed at the transverse center of the cross-head I′ is fitted a corresponding block, M″, more especially shown in Figs. 6, 7, 11, and 14, which is provided with a groove, m″, that extends from near the rear end forward through the transverse center of said block, and is open at its upper side and front end. The lower side of the groove m″ being semicircular, said groove receives and contains a cylindrical plunger or end-swage, N″, which extends forward from the block or carrier M″, through a corresponding opening in the front end of the cross-head I′, and has its forward end suitably recessed to correspond with the head of the bolt that is to be finished. The plunger has but one-fourth of its length contained within the groove m″, and in its rear is placed a block, O″, which substantially fills the space between its end and the rear end of said groove, a number of "shims," or thin plates of metal, being inserted between the rear ends of said block and groove, for the purpose of effecting the longitudinal adjustment of said plunger. The plunger N″ is secured in longitudinal position within its carrier by means of a plate or clamp, P″, which, at its forward end, rests upon and conforms to the shape of the rear end and upper side of said plunger, and, from thence extending rearward beyond the groove m″, bears upon the upper face of said carrier. The forward end of the clamp P″ is provided with a dowel-pin, p″, which extends vertically downward into a corresponding opening formed within the upper side of the plunger, while its rear end is provided with a longitudinal vertical slot, q″, which embraces a stud or pin, Q″, that extends vertically upward from the carrier M″. A set-screw, R″, passing horizontally inward through the end of the clamp, bears upon or against the rear side of the stud Q″, and presses said clamp and the plunger rearward until the latter has a firm bearing at its rear end. The vertical position of the plunger is insured by means of a lever, S″, which is pivoted at its front end to or within two lugs, T″, that extend upward from the carrier M″ upon opposite sides, and at the front end of the clamp P″, said lever being provided upon its lower side and forward end with a cam-shaped boss, s″, which, when turned downward, presses firmly upon said clamp. To release the clamp, and enable the same and the plunger to be removed, it is only necessary that the lever S″ should have its rear end turned upward and forward, so as to remove the boss s″ from contact with said clamp. The plunger or end-swage N″ is intended to move forward before the side or vertical swages operate, and, after upsetting the end of the bolt-blank, to be withdrawn, and the head completed by means of said swages. The forward motion of the plunger is effected by means of a cam, U″, which, revolving with the shaft D, impinges against the rear end of the carrier M″, while its withdrawal is accomplished by means of a lever, V″, having the form shown in Fig. 14, which is pivoted upon the shaft A′, and has its short vertical arm v″ connected by a pivoted bar, W″, to or with a lug, X″, that projects downward from the lower side of said carrier M″, said parts being arranged so that a downward movement of the rear end of said lever will cause a rearward movement of said carrier. A bar, A‴, having the form shown in Fig. 14, is pivoted at one end to or within the hub of the lever V″, and, extending rearward, has its rear end supported by means of a set-screw, B‴, which passes upward through said lever, and enables said bar to be raised or lowered, as occasion may require. As thus arranged, the bar A‴ is so adjusted as to cause its curved bearing a‴ to receive the cam U″ as the latter leaves the end of the carrier M″, as seen by the full lines in Fig. 14, when, by the downward and rearward movement of said cam, said bearing-bar and its connections are caused to occupy the positions shown by the dotted lines of said figure. An arm, C‴, secured to the bed-plate A, and extending downward and rearward beneath the lever V″, is provided with a set-screw, D‴, which receives said lever upon its downward movement. This mechanism, used in connection with the pivoted bearing-bar A''' and set-screw B''', enables the rear position of the carrier M'' and the plunger to be varied at will, as, by turning said set-screws in the same direction and to the same distance, the vertical position of the lever V'' will be correspondingly varied, so as to cause it to move said carrier rearward to a greater or lesser distance. The object of this arrangement is to enable the plunger to be used as a gage when the blank is inserted, the size and style of head required rendering necessary variations in the length of metal to be upset.

The mechanism is now complete, and operates as follows: A properly-heated blank is placed between the holding-dies, with its inner end in contact with the plunger, and the machine then set in motion. The holding-dies will first grasp the blank, the plunger will next move forward and upset its end, after which the vertical swages will move forward and inward, so as to compress the upper and lower sides of said upset end, and the operation be finally completed by means of the side-swages, which, passing within and closely filling the space, vertically, between the upper and lower swages, will compress the head sidewise, and give to it a perfect form. The swages are now moved apart, and the holding-dies opened so as to release the bolt.

It will be noticed that, as one pair of swages (whichever may be desired) remain closed, while the other pair impinge between them upon the head of the bolt, all liability to the formation of a burr or fin is avoided, and the metal forced endwise, so as to cause it to closely fill the space between said swages and the face of the holding-dies, and produce sharp, full corners upon the inner side of said bolt-head.

By causing both sets of swages to open and release the head, instead of having one of said sets relatively fixed and dragged endwise from said head, a much better result is produced, and a large amount of wear and consequent expense are avoided.

The portions of mechanism operated upon directly by the cams are preferably provided with friction-rollers, against which said cams have a bearing, as a result of which less power is required to operate the machine, and greater durability of bearings is secured.

Figure 20:
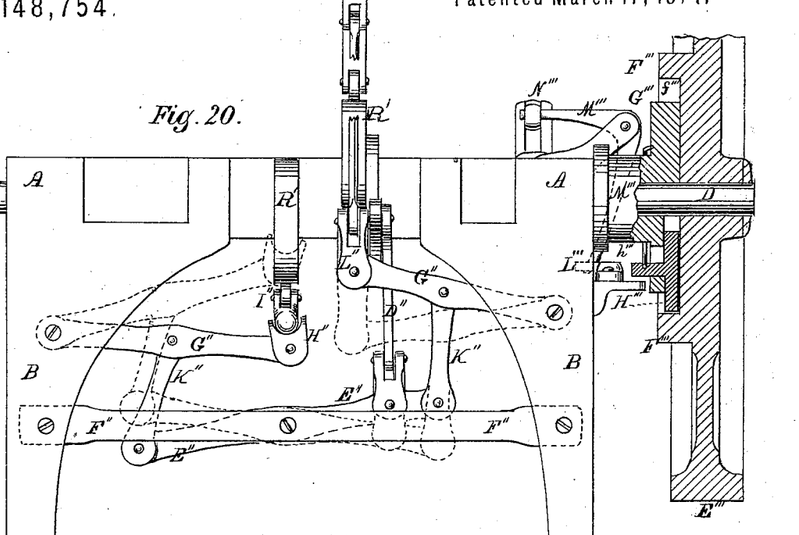
Fig. 20 is a rear elevation of the machine, showing the mechanism for operating the upper and lower swages, and, further, the driving-wheel in vertical section, with the mechanism for connecting the same to or with its shaft thrown out of gear.
Figure 21:
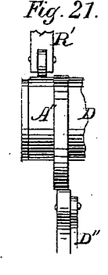
Fig. 21 is a partial rear view of the upper lever, showing the position of the same, the cam-shaft, and the lower connections when said lever is returned to place.
Figure 22:
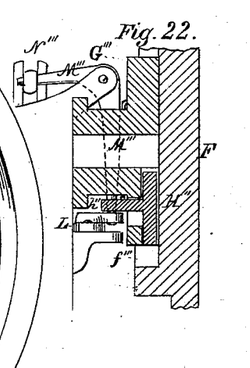
Fig. 22 is a partial vertical central section of the driving-wheel and its locking mechanism, showing the latter in gear.
Figure 23:
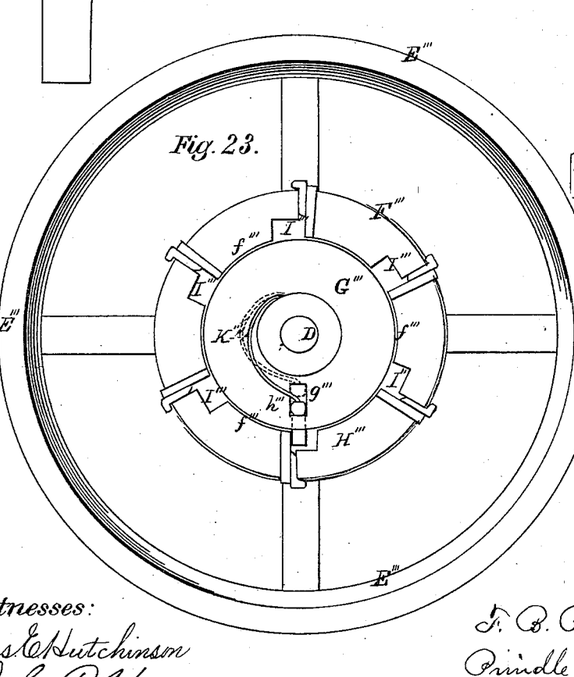
Fig. 23 is an elevation of the inner side of said wheel and of the locking-disk.

It being requisite that the machine should be so completely under control as to enable its motion to be arrested at any point of the revolution of its driving-shaft D, the driving-pulley and balance-wheel E''' is loosely journaled upon the end of said shaft, and connected therewith, when desired, by the following-described means: Secured to or upon the inner side of the wheel is a circular metal plate, F''', which is provided upon or within its inner face with a recess, f''', which receives a corresponding metal disk, G''', that is secured upon and revolves with the shaft. Within the outer face of the disk G''' is provided a radial right-angled groove, g''', which contains a corresponding bar or detent, H''', and permits the latter to slide therein longitudinally, so as to engage at its outer end with one of a series of corresponding radial notches, I''', that are provided at equidistant points within the circumference of the recess f''' of the plate F''', and lock said parts together. An arm, h''', attached to the detent H''', and extending horizontally inward through a suitable opening in the disk G''', receives one end of a spring, K''', which, pressing outward, holds said detent in engagement with its notches, unless purposely released therefrom. The detent H''' is released from engagement by means of a bar, L''', which is pivoted at one end to or upon the side of the bed-plate, and at its opposite or forward end is capable of swinging horizontally outward against the disk G'''. The revolution of the shaft D now brings the arm h''' into contact with the upper surface of the bar L''' before said arm reaches the lower vertical center, and, acting as a relatively-inclined plane, said bar forces said arm upward until the detent is withdrawn from its notch, when the motion of the machine is arrested, while the wheel E''' revolves freely upon its shaft. The releasing-bar L''' is operated by means of a lever, M''', which has the form shown in Figs. 20 and 22, and is pivoted to or upon the corner of the bed-plate, with its longest arm extending downward, and its end loosely connected to or with the end of said bar. The shorter or horizontal arm of the lever extends transversely inward, and is loosely connected at its end to or with the rear end of a lever, N''', which lever is pivoted to or upon the bed-plate at a short distance in advance of said end, so as to be capable of an oscillating movement in a vertical plane. The forward end of the lever N''' is within convenient reach of the operator, and, by raising the same, its rear end will be depressed, and the vertical arm of the lever M''' and the forward end of the bar L''' moved outward, so as to intercept the detent. To release the detent, it is only necessary that the forward end of the operating-lever N''' be depressed so as to remove the bar L from beneath the arm h''', when the spring K''' will press said detent outward into the first notch that coincides with its end.

The machine thus constructed is believed to possess, in a marked degree, efficiency and durability, combined with such simplicity as is consistent with the object sought to be accomplished.

Having thus fully set forth the nature and merits of my invention, what I claim as new is—

1. The combination, with an end-upsetting punch or die and two pairs of lateral swaging-dies, arranged to form heads upon bolts, of mechanism that shall first cause the upsetting-punch to stave up the end of the rod, and then the two pairs of lateral swages to swage the sides of said staved-up portion, in the manner described—that is to say, the one pair to move forward and compress the metal on two opposite sides, and remain in close contact therewith, while the other pair passes between the faces of said first pair and swages the other two sides, substantially as specified.

2. The means employed for connecting the sliding bars O to or with the carriers of the movable holding-die I, and of the side-swages T, consisting of the bar Q, working in the bearings $p$ and $o$, the toggle-bars R, and the slotted connecting-bar S, when said parts are constructed and combined with each other substantially as and for the purpose specified.

3. The means employed for imparting a reciprocating motion to the sliding bars O, consisting of the cams V and W, secured upon and revolving with the shaft D, the lever-arms B' and $b'$, journaled upon the shaft A', the pivoted bearing-bars G', and set-screws H', the lever F', the link E', and the pivoted connection C', substantially as and for the purpose shown.

4. The means employed for imparting a reciprocating motion to the cross-head I', consisting of the cams W' and Z', secured upon and revolving with the shaft D, the lever X', provided with the arm $x'$, and journaled upon the shaft A', and the pivoted connecting-bar Y', when said parts are constructed and combined substantially as and for the purpose shown and described.

5. The means employed for imparting a reciprocating motion to the plunger-carrier M'', consisting of the cam U'', secured upon and revolving with the shaft D, and the lever V'', journaled upon the shaft A', provided with the arm $v''$, the pivoted bar A''', and set-screw B''', and connected to or with said carrier by the pivoted bar W'', when said parts are constructed and combined substantially as and for the purpose specified.

6. The vertical swage-carriers K', when constructed and combined with the cross-head, substantially as and for the purpose shown.

7. The swage-holders L', provided with the set-screws M' and Q', the clamp O', provided with the set-screw $o'$, and the pin P', when said parts are constructed and combined with each other, the swage-carriers K', and the swages N', substantially as and for the purpose set forth.

8. The means employed for operating the vertical swages N', consisting of pivoted carriers K', the levers R', pivoted to or upon the cross-head, and combined with said carriers by the bearing-block T' and stirrup-clamp U' and V', the cams A'' and C'', the levers B'' and G'', the bars D'', E'', and I'', and the connection K'', when said parts are constructed and combined substantially as and for the purpose shown and described.

9. The construction and arrangement of the various parts of the hereinbefore-described bolt-heading machine, substantially as and for the purpose set forth.

In testimony that I claim the foregoing I have hereunto set my hand this 9th day of October, 1872.

FRANKLIN B. PRINDLE.

Witnesses:
    JOSHUA BILLS,
    WALTER S. MERRELL.